United States Patent
Freber

(10) Patent No.: US 6,597,522 B2
(45) Date of Patent: *Jul. 22, 2003

(54) OPTICAL SYSTEM

(76) Inventor: Werner Freber, Hohenweg 26 D-61184, Karben (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/053,099

(22) Filed: Jan. 18, 2002

(65) Prior Publication Data

US 2002/0060861 A1 May 23, 2002

Related U.S. Application Data

(63) Continuation-in-part of application No. 09/713,623, filed on Nov. 15, 2000, now Pat. No. 6,384,989.

(30) Foreign Application Priority Data

Jan. 28, 2000 (DE) .......................... 100 03 789
Jan. 20, 2001 (EP) .............................. 1122576

(51) Int. Cl.[7] ............................................. G02B 27/02
(52) U.S. Cl. ...................... 359/799; 359/798; 359/800
(58) Field of Search ................................ 359/799, 809, 359/801, 802, 804, 387, 389, 599; 362/33, 246, 245

(56) References Cited

U.S. PATENT DOCUMENTS

| 5,267,087 A | 11/1993 | Weidemann |
| 5,752,767 A | 5/1998 | Muehlemann |
| 5,781,338 A | 7/1998 | Kapitza et al. |
| 6,384,989 B1 * | 5/2002 | Freber ........................ 359/799 |
| 6,449,088 B1 * | 9/2002 | Pettingell et al. ........... 359/386 |

FOREIGN PATENT DOCUMENTS

| DE | 37 34 691 | 4/1988 |
| DE | 197 48 211 | 5/1999 |
| EP | 0 504 940 | 8/1999 |
| WO | WO-9939184 A1 * | 8/1999 .......... G01N/15/14 |

* cited by examiner

Primary Examiner—Ricky Mack
(74) Attorney, Agent, or Firm—Collard & Roe, P.C.

(57) ABSTRACT

An optical system for imaging the surface of the bottom of a well of a microtiter plate made of a transparent material. This surface has an analysis preparation. The optical system comprises an enlarging lens and an incident-light illumination formed by a ring-shape, diffuse light source. The incident light illumination is arranged concentrically with the optical axis. The microtiter plate is illuminated from the backside by an approximately dot-shaped light source, which is arranged behind the diffuser disk and centered in relation to the optical axis. Reflections and material flaws in the area located outside of the measuring area to be evaluated are thus made invisible.

5 Claims, 3 Drawing Sheets

OPTICAL SYSTEM

CROSS-REFERENCE TO RELATED APPLICATION

This is a continuation-in-part of U.S. patent application Ser. No. 09/713,623, filed Nov. 15, 2000 now U.S. Pat. No. 6,384,989. Applicant claims priority under 35 U.S.C. 119 of German application No. 100 03 789.5, filed Jan. 28, 2000 and European application No. 1 122 576, filed Jan. 20, 2001.

BACKGROUND OF THE INVENTION

1. Field of the Invention

The invention relates to an optical system that comprises an enlarging lens that creates an image on a transparent microtiter plate which receives an analysis preparation. This optical system has a plurality of cup-shaped wells, and an incident light illumination arranged on the lens-side of the microtiter plate for illuminating the analysis preparation received by the microtiter plate.

2. The Prior Art

Optical systems of the type referred to are used for the evaluation of ELISPOT (Enzyme Linked Immuno Spot) assays. This method has been devised for identifying beta cells secreting individual antibodies. This method can be used for the identification of cytokine secretions of special subgroups of leukocytes or T-lymphocytes from peripheral blood as well as of monocytes and granulocytes. In the ELISPOT method, proteins secreted from the cells are identified with antibodies, and point-shaped stains referred to as spots are produced by means of special coloring methods. These spots are permanent and suitable for evaluation, both visually and by means of image analysis. In laboratory routine, ELISPOT assays are typically performed using microtiter plates (MTP), which are also commercially designated as filter plates or multiscreen plates. The microtiter plates comprise small interlinked cups also referred to as cavities or wells. The bottom of the cups are conventionally formed by a filter membrane to which the point-shaped objects subject to the assay adhere. A standard size MTP comprises 96 wells.

To evaluate an ELISPOT assay it is necessary to count the small spots of up to 1,500 per well which are visible on the bottom of the wells of an MTP, the bottom providing the measurement surface. To this effect, automatically operating evaluating devices are used which image the surface of the bottom of the individual wells with about twenty- to fortyfold magnification. These devices take the images with an electronic camera, and evaluate the digitized image data by means of an electronic computer.

The processes of imaging and evaluating the microtiter plates present the problem that reflection outside the filter membrane produces a phantom image of the filter membrane, so that the spots occurring in the marginal area are detected twice, which introduce errors into the measurement process. To prevent this problem from happening, one possibility would include masking the areas lying outside the well with a circular mask. This would however necessitate an exact positioning of the individual wells of the microtiter plate relative to the optical axis. This is a highly complex and difficult task considering that the microtiter plate manufacturers do not guarantee an absolutely accurate positioning of the filter membranes and the adjustment accuracy of an X-Y table necessary for positioning would have to lie in the range of approximately 20 $\mu$m. To solve this problem, one proposal includes detaching the filter membranes from the MTP, adhering them to a film and then optically detecting and evaluating the adhered filter membranes. Separating the filter membranes from the MTP prevents the generation of a phantom image by reflection. However, the disadvantages of this approach are that the processes of detaching and adhering require an additional procedure. This procedure results in having individual membranes shifting out of place as the filter membranes are detached, wherein the film material's service life is limited. On the other hand, recent image analytical devices provide an easy way to determine the position of the adhered filter membranes and cause an X-Y table to travel to the center of the image, if necessary.

In another known system of the type referred to, the positioning of the magnifying objective initially involves detecting the MTP from a major distance without appreciable magnification and then using this image for measuring and storing the exact position of the individual wells. These stored values can be used to position the magnifying objective above the individual wells automatically. This necessitates a relatively high construction effort for the optical system and the positioning table, and additional memory capacity is needed for storing the position-related data.

A microscope for fluorescence, luminescence and absorption tests of minute amounts of samples is known from DE 197 48 211 A1. These minute amounts are made available in microtiter plates with containers for minute amounts arranged in the form of a matrix. To create an image of the individual samples on an CCD-array provided for their detection, an optical system of the type commonly used, is combined with a mini-lens array that is composed of small lenses. These lenses are arranged with the same matrix dimension as the containers of the microtiter plate for the samples. For the incident light illumination, an illuminating device supplies light to a coupling mirror arranged in the path of the light beam. Using the optical system of the microscope, this light illuminates the spots on the microtiter plate that are imaged on the CCD-array.

An illuminating system for a system microscope with a revolver-type lens is known from EP 0 504 940 A2, wherein the light of a light source is aimed at the object to be viewed on the side of the lens via light-conducting fibers in the form of a ring with respect to the optical axis via a ring-shaped condenser lens. In addition, there is also a reversing mirror and a condenser lens on the side facing away from the lens along the optical axis via a lens system. No provision is made in this case for viewing microtiter plates.

German patent No. DE 3734691C2 discloses an illuminating device for a microscope comprising a multitude of flatly arranged illumination elements, which can be controlled individually and preset in a desired illumination pattern for the object to be assayed. The illumination elements, which are designed as active semiconductor sources, are arranged as through-light illumination behind a diffuser disk and can be ignited in a ring-shaped arrangement.

SUMMARY OF THE INVENTION

It is an object of the present invention to provide an optical system of the type initially referred to which enables the measurement surfaces of a transparent MTP to be imaged without the occurrence of reflections interfering with the image evaluation.

Another object of the invention is to form an incident light illumination by a diffuse, ring-shaped light source that is arranged concentrically with the optical axis. Another object is to form a second, substantially dot-shaped light source disposed on the optical axis on the side of the microtiter plate facing away from the lens. This light source supplies the analysis preparation with through-light and with a higher light density higher than the one of the ring-shaped light source.

The illumination according to the invention the MTP area lying outside the measurement surface of the filter membrane is imaged completely white. By contrast, the prepared measurement surface is set off against this light background in a lightly gray color. Reflections and material interferences in the area lying outside the measurement surface needing to be evaluated are no longer visible. This effect can be further enhanced by arranging the approximately point-shaped light source behind a diffuser disk, thus accentuating the contrast between measurement surface and background.

Another object of the invention is that the incident light illumination on the lens side can be achieved also by deflecting light, for example diffuse scatter light to the lens side of the microtiter plate. This deflection may take place with the help of reflecting surfaces or light-conducting elements, which are substantially concentrically arranged with the optical axis.

The optical system of the present invention provides fault-free imaging and evaluation of the measurement surfaces of an MTP's filter membranes. Even minor inaccuracies in locating the measurement surface centrally to the optical axis will not impair the accuracy of measurement so that the demands placed on the positioning accuracy of the table carrying the MTP and movable in the X and Y direction may be less high. Accordingly, this process enables the table to be manufactured more economically. The distinct contrast of the measurement surfaces from the light background surrounding them, makes it possible to determine the position of the measurement surfaces by means of image analysis and to move them automatically to the image center under appropriate table control. An automatic evaluation of microtiter plates is hence readily possible.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
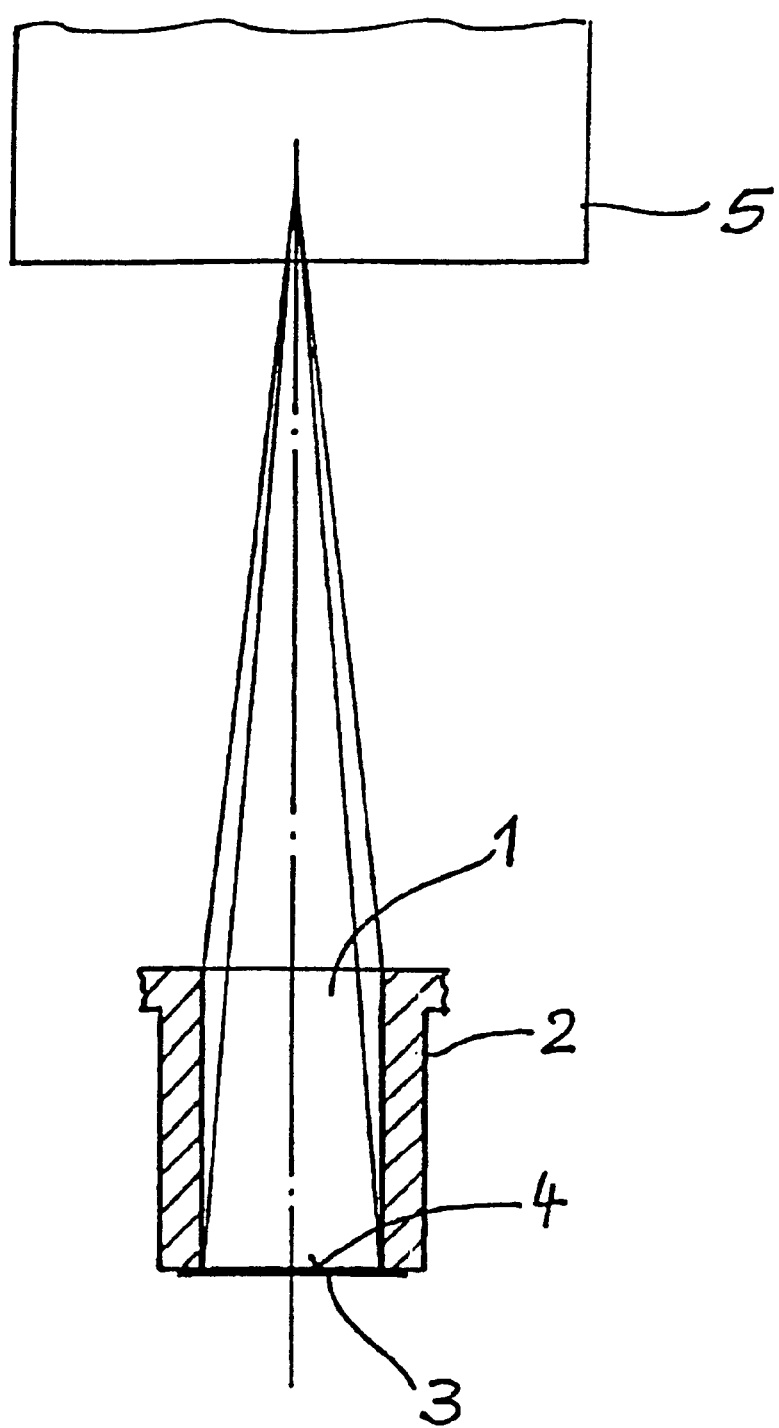
FIG. 1 is a cross section through the well of a microtiter plate (MTP) with the imaging beam path of a lens.

Referring now in detail to the drawings and, in particular, FIG. 1 shows a cross section through a well 1 of a commercially available microtiter plate (MTP) of the type used for ELISPOT analyses. Well 1 is comprised of a small cylindrical tube 2, which is made of a transparent plastic. The lower opening of small tube 2 is sealed by a filter membrane 3 that is glued to small tube 2 and forms a bottom of well 1, which is transparent. The surface of filter membrane 3 facing the cavity of well 1 forms the measurement surface 4 to which the dot-shaped objects of the analysis adhere.

To evaluate an ELISPOT assay, there is an optical system 5 which produces a magnified image of measurement surface 4 which is then taken by an electronic camera for processing by means of image analysis. The beam path shown in FIG. 1 illustrates the areas of well 1 imaged by optical system 5. Apart from measurement surface 4, also the cylindrical wall of well 1 will be imaged as a ring surrounding the image of measurement surface 4. As a result, reflections of measurement surface 4 on the cylindrical wall of the well 1 may also be imaged, which involves the risk of errors being introduced in the evaluation because of the difficulty to distinguish them from the image of measurement surface 4.

Figure 2:
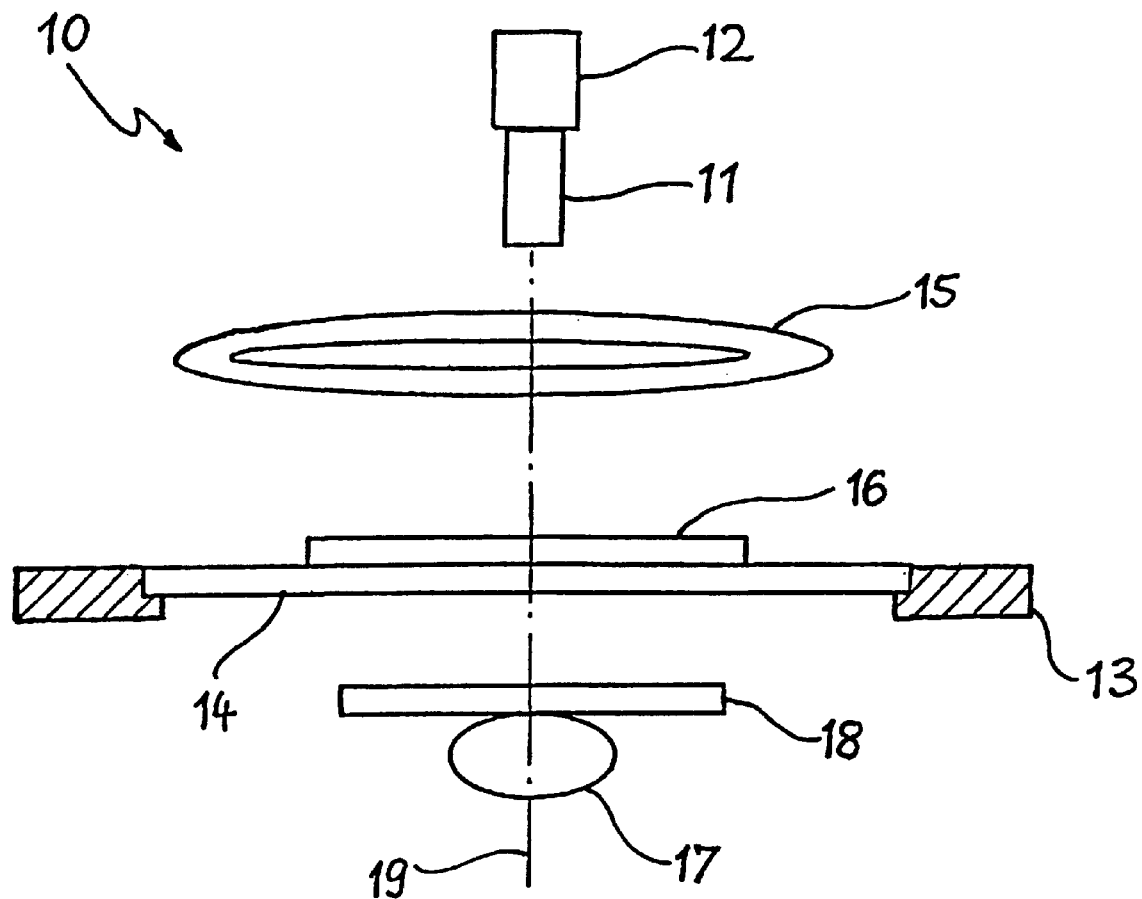
FIG. 2 is a schematic representation of a microscope as defined by the invention.

FIG. 2 shows the structure of a microscope 10 an imaging of the wall area of a well surrounding the measurement surface can be prevented. Optical system 10 comprises an enlarging lens 11 with a camera 12, which is arranged above a table or surface 13 with a transparent carrier plate 14. Table 13 is displaceable in the X- and Y-directions. Furthermore, a ring-shaped light source 15, such as an LED diffuser lamp is mounted above table 13, Table 13 has a microtiter plate 16 arranged on carrier plate 14 which is illuminated from the top via light source 15. A dot-shaped light source 17, and the diffuser disk 18 is arranged underneath carrier plate 14 of table 13. Light source 17 may be formed by a plurality of light-emitting diodes, which are arranged close to one another. The two light sources 15 and 17 are centered in relation to optical axis 19 of lens 11. The illumination density of light sources 15 and 17 is adjustable, and the illumination density of light source 17 is distinctly higher than the one of light source 15.

Figure 3:
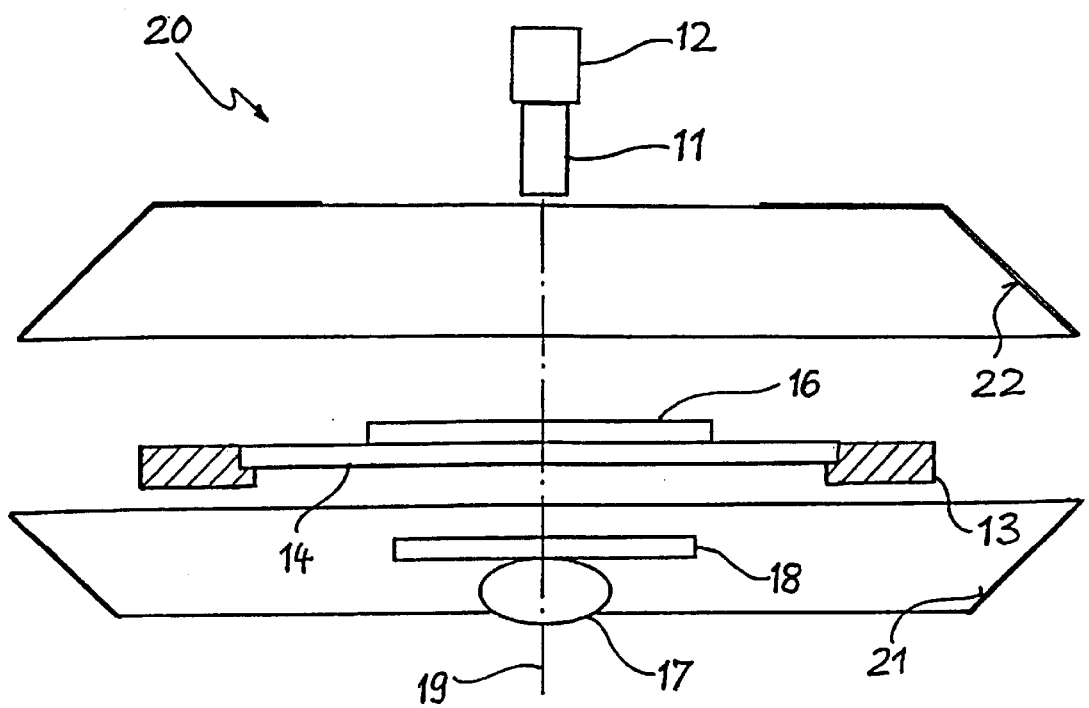
FIG. 3 is a schematic representation of another embodiment of a microscope as defined by the invention.

FIG. 3 shows another embodiment of the invention wherein the incident light illumination of microtiter plate 16 on a lens-side is created by deflecting diffuse scatter light, which is generated by dot-shaped light source 17 located on the side of microtiter plate 16 facing away from the lens. Ring shaped deflection areas 21 and 22 are disposed underneath and above table 13, which have a reflecting surface and deflect scatter light from the through-light illumination of light source 17. This deflection creates a diffuse, homogeneous illumination on a side of microtiter plate 16 facing lens 11 in an area of the imaged measurement surface. Above this first embodiment, the illumination density of the scatter light deflected by the incident light illumination is substantially lower than the illumination density of light source 17 aimed in the through-light at the analysis preparation. Thus an image of the wall area of the well covered by the lens is avoided in an analogous manner.

Accordingly, while at least one embodiment of the present invention have been shown and described, it is obvious that many changes and modifications may be made thereunto without departing from the spirit and scope of the invention.

What is claimed is:

1. An optical system for creating images of a well (1) on a microtiter plate (16) made from transparent material, the system comprising:

a) a magnifying objective comprising a lens (11) and a camera (12) disposed adjacent to each other, wherein said objective (11, 12) creates an image of a surface having an analysis preparation of a bottom of the well (1) of the microtiter plate (16);

b) a first illumination source (17) disposed below said surface having analysis preparation, on a rear side of the microtiter plate (16) facing away from said magnifying objective (11, 12) wherein said first illumination source (17) has an approximately point-shaped light source which is centrally located relative to an optical axis (19), wherein said light emitted from said first illumination source (17) is reflected to an observation side of the microtiter plate (16) and faces said magnifying objective (11, 12) for illuminating the surface of the microtiter plate (16) with incident light wherein a rear side of the microtiter plate (16) is irradiated with a higher light density than the observation side of the microtiter plate (16).

2. The optical system according to claim 1, further comprising a diffuser disk (18) disposed adjacent to said first illumination source (17), wherein said first illumination source (17) is arranged behind said diffuser disk (18) and illuminates the microtiter plate (16) in a diffuse manner.

3. The optical system according to claim 1 wherein said first illumination source (17) is focused with the help of reflecting or refracting means on the side of the well (1) of the microtiter plate (16) facing away from the lens, said well (1) being disposed on the optical axis.

4. The optical system according to claim 1, further comprising an additional light source (15), disposed above the microtiter plate (16), wherein the illumination density of said first illumination source (17) and said additional light source (15) is adjustable.

5. The optical system according to claim 1, further comprising a plurality of reflectors (21, 22) disposed adjacent to said surface wherein said first illumination source (17) is disposed coaxial with the optical axis (19), said light source illuminating the analysis object with through-light;

wherein the incident light illumination is created by at least one of said plurality of reflectors (21, 22) deflecting light from a side of the microtiter plate (16) facing away from said lens, to a side of the microtiter plate facing said lens, whereby said first light source illuminates the analysis object with an illumination density higher than the one of the deflected light.

* * * * *